(12) United States Patent
Bogoni et al.

(10) Patent No.: US 8,467,121 B2
(45) Date of Patent: Jun. 18, 2013

(54) OPTICAL SIGNAL PROCESSING

(75) Inventors: Antonella Bogoni, Mantova (IT); Luca Poti, Pisa (IT); Emma Lazzeri, Arcola (IT); Gianluca Meloni, Pisa (IT); Filippo Ponzini, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 256 days.

(21) Appl. No.: 12/919,554

(22) PCT Filed: Feb. 29, 2008

(86) PCT No.: PCT/EP2008/052537
§ 371 (c)(1),
(2), (4) Date: Nov. 22, 2010

(87) PCT Pub. No.: WO2009/106145
PCT Pub. Date: Sep. 3, 2009

(65) Prior Publication Data
US 2011/0069362 A1    Mar. 24, 2011

(51) Int. Cl.
*G02F 3/00* (2006.01)
*G02F 2/00* (2006.01)

(52) U.S. Cl.
USPC ......... 359/325; 385/3; 385/9; 385/30; 385/32

(58) Field of Classification Search
USPC ............... 359/325; 385/3, 5, 8, 9, 27, 30, 32, 385/42
See application file for complete search history.

(56) References Cited

U.S. PATENT DOCUMENTS

| | | | |
|---|---|---|---|
| 5,301,008 A * | 4/1994 | Huang et al. | 359/320 |
| 5,493,433 A | 2/1996 | Prucnal et al. | |
| 5,857,040 A * | 1/1999 | Bigo et al. | 385/15 |
| 6,222,959 B1 * | 4/2001 | Evans | 385/27 |
| 6,665,480 B2 * | 12/2003 | Watanabe | 385/122 |
| 6,671,426 B2 * | 12/2003 | Litvin | 385/15 |
| 7,409,157 B2 * | 8/2008 | Arahira | 398/45 |
| 7,848,601 B2 * | 12/2010 | Carothers | 385/32 |

FOREIGN PATENT DOCUMENTS

| | | |
|---|---|---|
| EP | 0 456 422 | 11/1991 |
| WO | WO 02/103449 | 12/2002 |

OTHER PUBLICATIONS

International Search Report for PCT/EP2008/052537, mailed Aug. 5, 2008.
Masahiko, J. et al., "Nonlinear Sagnac Interferometer Switch and its Applications", IEEE Journal of Quantum Electronics, vol. 28, No. 4, (Apr. 1, 1992), pp. 875-882.
Jinno, Masahiko; Nonlinear Sagnac Interferometer Switch and Its Applications; IEEE Journal of Quantum Electronics, vol. 28, No. 4, Apr. 1992, pp. 875-882.

* cited by examiner

*Primary Examiner* — Daniel Petkovsek
(74) *Attorney, Agent, or Firm* — Nixon & Vanderhye P.C.

(57) ABSTRACT

An optical signal processor may include an optical waveguide loop, and first and second phase modulator loops. Each of the first and second phase modulator loops may be in optical communication with the optical waveguide loop. The first and second phase modulator loops may include respective control signal input ports to control phase modulation applied by the first and second phase modulation loops. The optical waveguide loop may include two input ports to direct input signals in opposite directions in the optical waveguide loop and may further include an output port to output resulting signals.

18 Claims, 8 Drawing Sheets

OPTICAL SIGNAL PROCESSING

This application is the U.S. national phase of International Application No. PCT/EP2008/052537, filed 29 Feb. 2008, which designated the U.S, the entire contents of which is hereby incorporated by reference.

TECHNICAL FIELD

The present invention relates to optical signal processing.

BACKGROUND

The need for all-optical signal processing techniques arises from electronics limits such as computing and transmission speed, electromagnetic interference, power consumption, and insufficient bandwidth for ultra-fast applications. Known optical processors show the possibility to fulfil all optical signal processing by means of diverse optical devices such as Semiconductor Optical Amplifiers (SOAs), Semiconductor Saturable Absorber Mirrors (SESAMs) and single or cascaded Nonlinear Optical Loop Mirrors (NOLMs).

Integrable solutions, like those mentioned above, are interesting for their applications but currently are not able to meet acceptable performance in terms of fast dynamics and reconfigurability.

SUMMARY

According to an aspect of the invention, there is provided an optical signal processor comprising an optical waveguide loop, and first and second phase modulator loops. Each of the first and second phase modulator loops is in optical communication with the optical waveguide loop, and the first and second phase modulator loops each comprises a respective control signal input port to control phase modulation applied by the phase modulation loops. The optical waveguide loop comprises two input ports to direct input signals in opposite senses in the optical waveguide loop and further comprises an output port to output resulting signals.

According to another aspect of the invention, there is provided a method of processing optical signals comprising causing two input signals to counter-propagate in an optical waveguide loop, and pass through first and second phase modulator loops. The first and second phase modulator loops are in optical communication with the optical waveguide loop The method further comprises feeding a control signal into a control port of each of the first and second phase modulator loops so as to control phase modulation applied to the input signals by each of the phase modulators, and combining the resulting signal components to produce an output signal.

DESCRIPTION OF THE DRAWINGS

Various embodiments of the invention will now be described, by way of example only, with reference to the following drawings in which.

DETAILED DESCRIPTION

Figure 1:
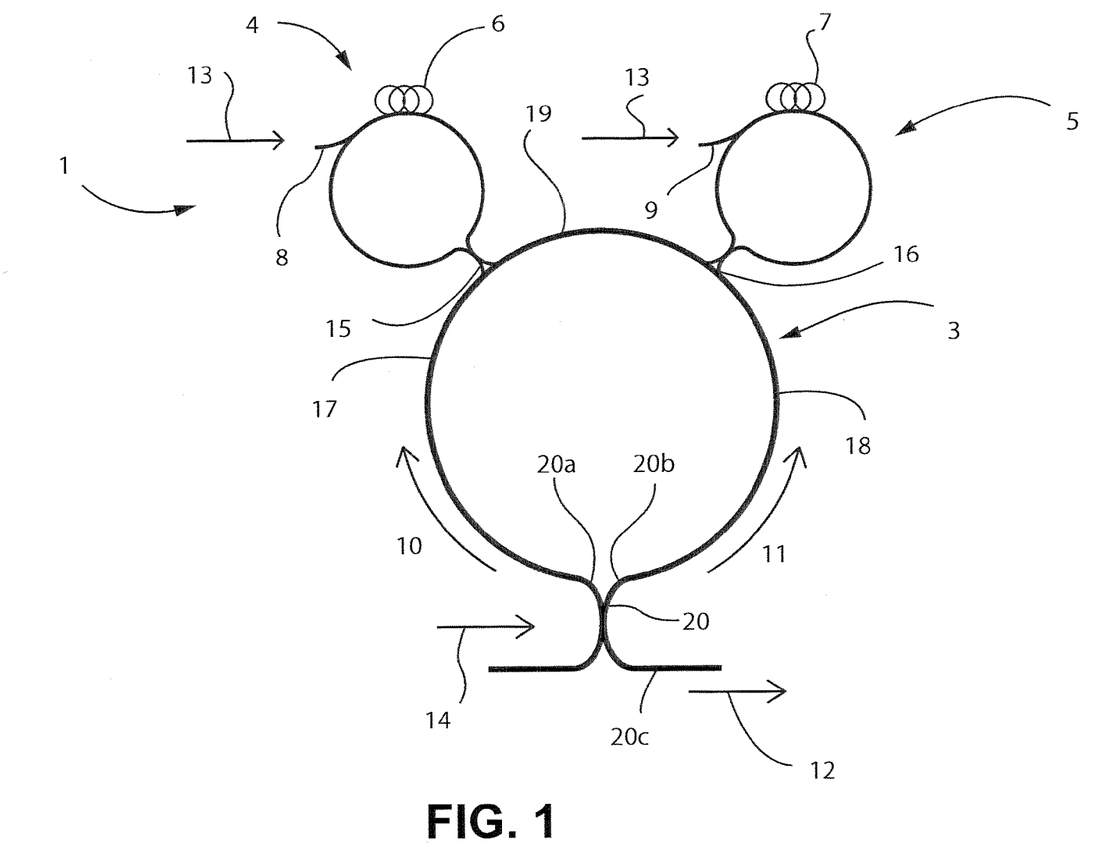
FIG. 1 illustrates an embodiment of an optical signal processor.

With reference to FIG. 1 there is shown an optical signal processor 1 comprising an optical waveguide loop 3 and first and second nonlinear phase modulator loops 4 and 5 which are coupled to the optical waveguide loop 3. Each phase modulator loop comprises a Highly Nonlinear Fibre (HNLF) portion 6 and 7, and a respective first and second control signal input port 8 and 9.

Figure 2:
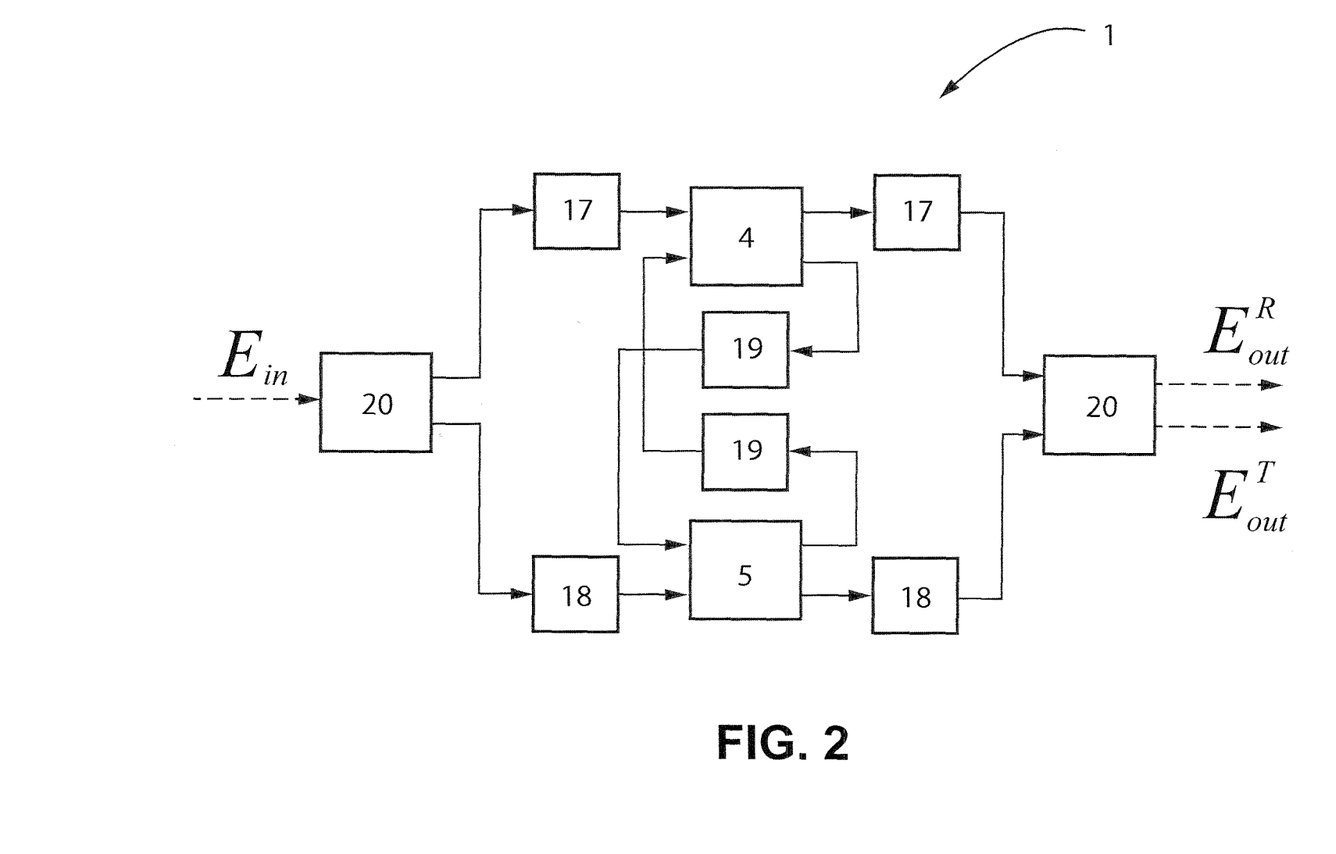
FIG. 2 is a block diagram of the optical signal processor embodiment of FIG. 1.

Each phase modulator loop 4 and 5 comprises a Cross Phase Modulation (XPM) based Polarisation Maintaining (PM) Nonlinear Optical Loop Mirror (NOLM) (indicated with $N^{(k)}$, k=1, 2. in FIG. 2 right) are connected by three fibre spans—a first span 17, a second span 18 and a third span 19—and a respective coupler 15 and 16 (C(ρ) as in (2)) is provided for each phase modulator. Generally if D is a fibre span then $D^{(i)} = e^{j\beta L_F^{(i)}}$, i=1, 2, 3. where $L_F^{(i)}$ is the i-th fibre length. An input signal 14 is fed into the processor 1 at the coupler/splitter 20 which has two input ports 20a and 20b to produce two input signals into the respective fibre spans 17 and 18 to produce two input signal components—a first signal component 10 and a second signal component 11.

In order to better understand the manner of operation of the processor 1, we consider one of each of the phase modulators 4 and 5, which as stated above comprises a PM-NOLM device. We refer to FIG. 3 which is shown as a PM-NOLM 100. The device 100 comprises a Highly Non-Linear Fibre (HNLF) of length $L_{HNLF}$[m] and non-linear coefficient γ [$W^{-1}Km^{-1}$], and two couplers 101 and 102, the former used to introduce the power of a pump signal at a wavelength $\lambda_p$ (dashed arrows) into the loop, the latter to complete the NOLM structure as well as to allow the insertion of input fields and drop of output ones. The couplers have splitting ratios $\rho_p$ and $\rho$ respectively.

Figure 3:
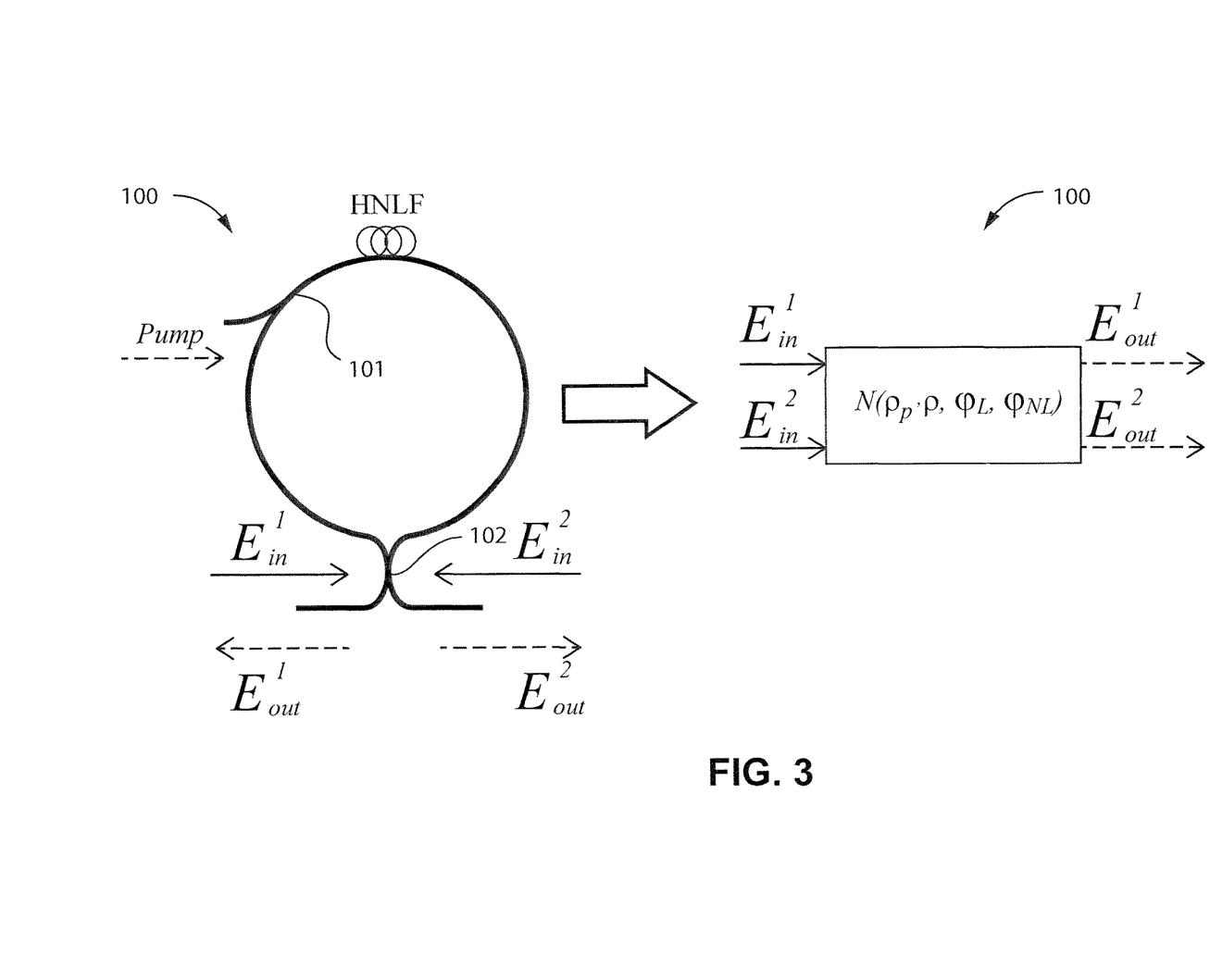
FIG. 3 illustrates an embodiment of a NOLM device of an optical signal processor.

In the PM-NOLM 100 all the components are polarization maintaining. Although this aspect can limit the flexibility of the scheme (non-PM fibres require the use of a polarization controller in the loop that adds a degree of freedom in the optimization process), use of a PM configuration in order to simplifies the model, considering all fields as polarized along the fibre birefringence slow axis. In such a way, it is easier to predict the behavior of the system and adjust the input parameters to obtain the desired response.

Each NOLM can be considered as a single basic quadripole (as shown schematically in FIG. 3) defined through its 2×2 matrix N.

The block accepts an input vector $\overline{E_{in}}$ (solid arrows) and returns an output vector $\overline{E_{out}}$ (dotted arrows) that can be found as:

$$\overline{E_{out}} = \begin{bmatrix} E_{out}^1 \\ E_{out}^2 \end{bmatrix} = N\overline{E_{in}} = N\begin{bmatrix} E_{in}^1 \\ E_{in}^2 \end{bmatrix}; \quad (1)$$

where:

$$N = \sqrt{\rho_p}\, e^{j\varphi_L}\begin{bmatrix} \sqrt{\rho(1-\rho)}\,(1+e^{j\varphi_{NL}})e^{j\frac{\pi}{2}} & \rho - (1-\rho)e^{j\varphi_{NL}} \\ \rho e^{j\varphi_{NL}} - (1-\rho) & \sqrt{\rho(1-\rho)}\,(1+e^{j\varphi_{NL}})e^{j\frac{\pi}{2}} \end{bmatrix}$$

Equation (1) states that the PM-NOLM 100 processes the input fields introducing two different phase shifts: a linear one, $\phi_L$, which is referable to the delay caused by the loop length $L_{loop}$, $\phi_L = \beta L_{loop}$ ($\beta$ is the propagation constant of the electrical field in fibre) and a nonlinear one, $\phi_{NL}$, that is due to the XPM effect induced by the pump power on the input field in the highly non linear fiber $\phi_{NL} = 2\gamma(1-\rho_p)P_pL_{HNLF}$, where $P_p$, is the instantaneous pump power and the coupler loss has been taken into account. The model assumes the input signals to be continuous waves at a certain wavelength $\lambda_{in} \neq \mu_p$.

We can describe these elements with matrices as reported in equations (2) where C models the behavior of a coupler with splitting ratio $\rho$ and D represents the phase shift induced by a fibre span of length $L_F$.

$$C = \begin{bmatrix} \sqrt{\rho} & \sqrt{1-\rho}\, e^{j\frac{\pi}{2}} \\ \sqrt{1-\rho}\, e^{j\frac{\pi}{2}} & \sqrt{\rho} \end{bmatrix}; \quad (2)$$

$$D = [e^{j\theta}], \theta = \beta L_F.$$

Returning now to the processor 1, our interest is focused on Reflectivity (R) and Transmittivity (T) as functions of the nonlinear phase shifts ($\phi_{NL}^{(1)}$, $\phi_{NL}^{(2)}$) which can be easily ascribed to the pump powers ($P_p^{(1)}$, $P_p^{(2)}$)) by linear conversion; the linear phase shifts introduced in the structure depend on the particular fibre span or loop lengths of 17, 18 and 19 and are considered as parameters in the following equations that define the Transmittivity (T) and the Reflectivity (R):

$$T(\varphi_{NL}^{(1)}, \varphi_{NL}^{(2)}; \varphi_L^{(1)}, \varphi_L^{(2)}, \theta^1, \theta^2, \theta^3) = \frac{P_{out}^T}{P_{in}} = \frac{|E_{out}^T|^2}{|E_{in}|^2}; \quad (3)$$

$$R(\varphi_{NL}^{(1)}, \varphi_{NL}^{(2)}; \varphi_L^{(1)}, \varphi_L^{(2)}, \theta^1, \theta^2, \theta^3) = \frac{P_{out}^R}{P_{in}} = \frac{|E_{out}^R|^2}{|E_{in}|^2}.$$

By substituting the expressions of and $E_{out}^R$ and $E_{out}^T$ obtained from the block diagram in FIG. 2, it is possible to demonstrate that $\theta^1$ and $\theta^2$ appear in the Transmittivity and Reflectivity functions only in the term $\Delta\theta = \theta^1 - \theta^2$ and thus we can say that T and R depend on the relative path lengths of fibre spans 17 and 18 and not on the specific lengths of each of the fibre spans.

In use of the processor 1, the first and second input signal components 10 and 11 enter the processor 1 by input ports 20a and 20b and propagate in opposite senses in the loop 3. For simplicity, the direction that the first and second signal components 10 and 11 propagate will be respectively referred to as first and second direction. Then as seen in FIG. 1, it can be said that an optical path is formed such that first and second ends of the first span 17 are respectively in optical communications with the coupler 20 (e.g., at port 20a) and a first end of the first phase modulator loop 4 (e.g., at coupler 15), first and second ends of the third span 19 are respectively in optical communications with a second end. of the first phase modulator loop 4 (e.g., also at coupler 15) and a first end of the second phase modulator loop 5 (e.g., at coupler 16), and first and second ends of the second span 18 are respectively in optical communications with a second end of the second phase modulator loop 5 (e.g., also at coupler 16) and with the coupler (e.g., at port 20b). The first signal component 10 enters the phase modulator loop 4 and the second signal component 11 enters the phase modulator loop 5. After having passed through each HNLF, and having been phase modulated thereby, on exiting the respective modulator loop at couplers 15 and 16 they propagate through the span 19 and then pass around the other phase modulator loop. The resulting first and second signal components are then combined at the output 20c of the coupler 20. The relative phase between the component signals being combined at the output 20c will determine the type of interference which occurs as a result of the signals By appropriate linear phase shifts tuning, different Transmittivity and Reflectivity functions can be obtained. The splitting ratios of the couplers' 15. 16 and 20 are equal to 0.5. We show here a set of results obtained for different parameter values. All results suppose the input field $E_{in}$ to be a continuous wave at $\lambda_{in} = 1550$ nm.

Figure 4:
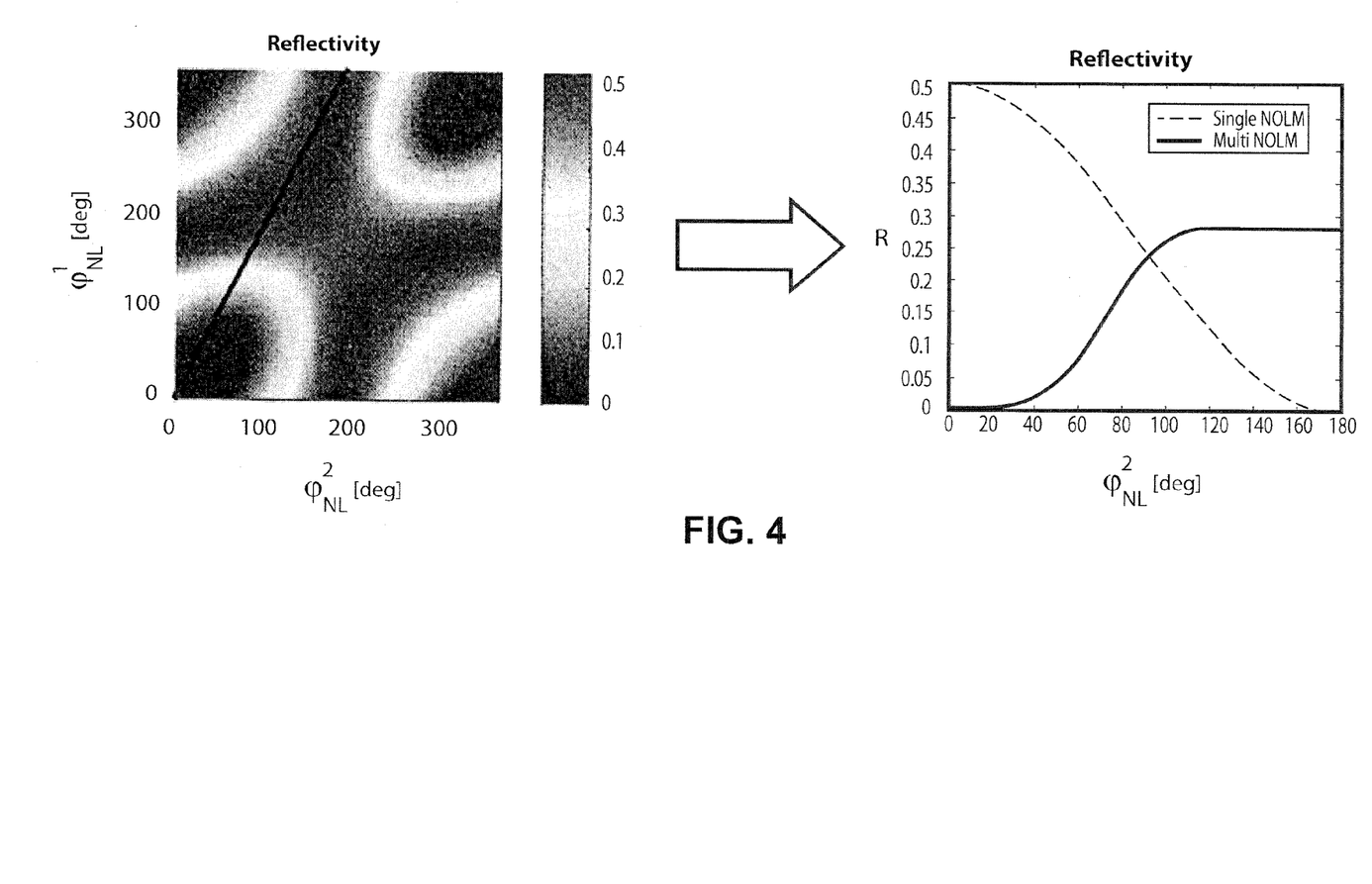
FIGS. 4 to 7 illustrate example outputs represented graphically of an optical signal processor.

By introducing a linear dependence between the nonlinear phase shifts (and consequently between the pump powers) caused by the phase modulators 4 and 5 different Reflectivity and Transmittivity curves can be extracted from the bi-dimensional plots as in FIG. 4. In FIG. 4, an R-curve with a steep soft limiting function serves as an efficient in-line data regenerator.

Figure 5:
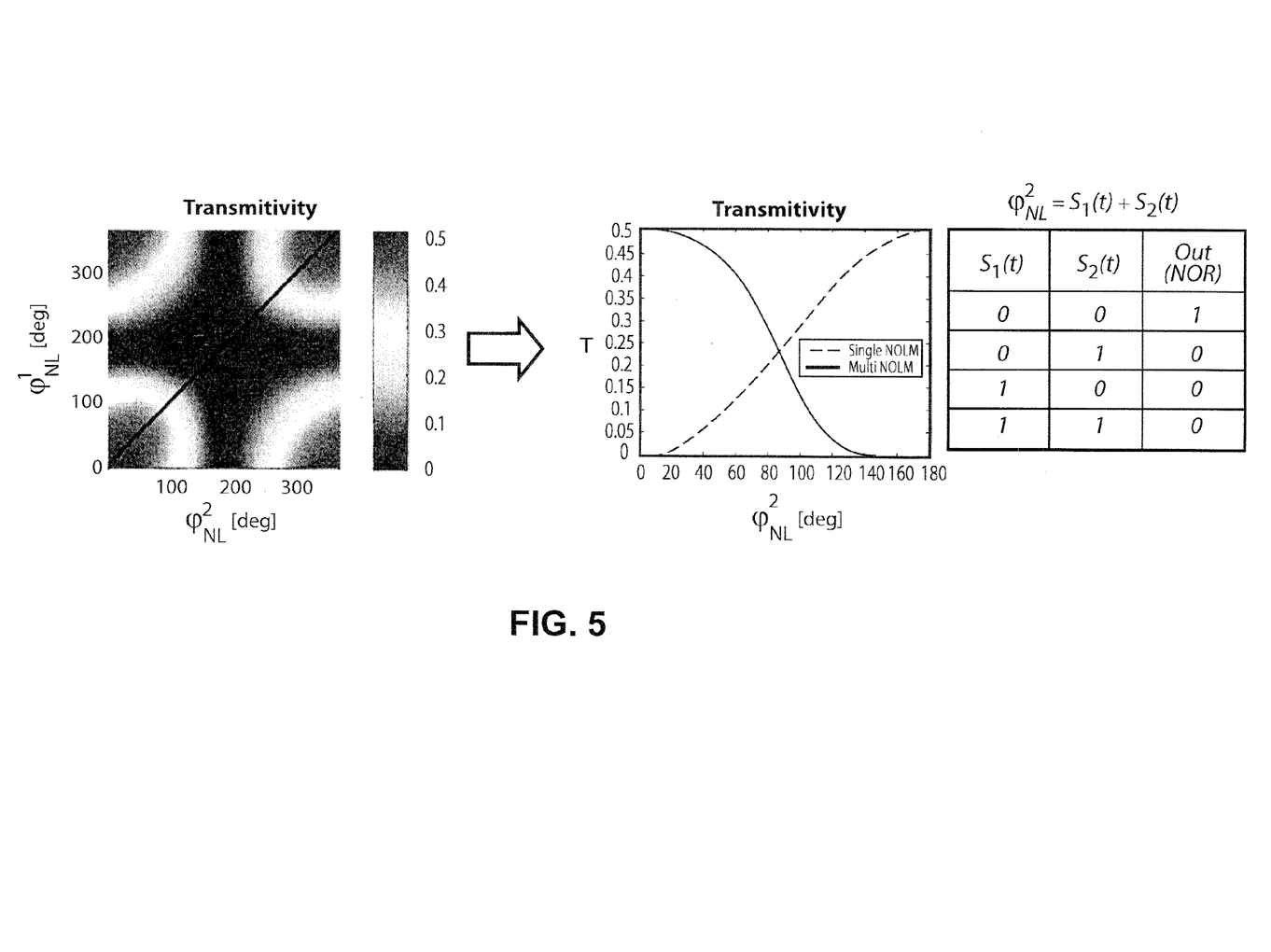

FIG. 5 shows a T-curve that can be exploited as logical port: the input signals of the port $S_1(t)$ and $S_2(t)$ are combined to form the control signals 13 to the phase modulator loops 4 and 5 and so the phase shifts are exactly the same for each XPM-based NOLM block. FIG. 5 also shows the truth table of the corresponding NOR logic gate. In FIGS. 4 and 5, and referring back to the equations set out above, $\theta^1 = 0°$, $\theta^2 = 0°$, $\theta^3 = 0°$, $\Delta\phi_{NL} = 0°$.

Figure 6:
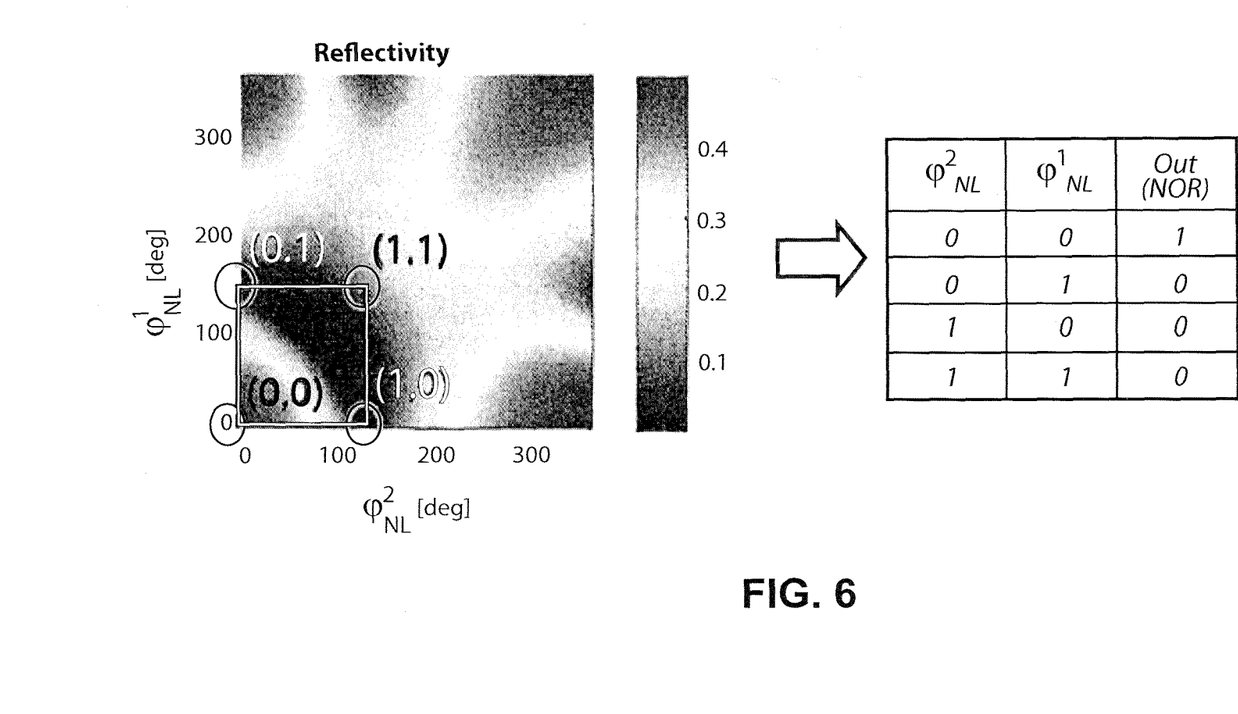
Figure 7:
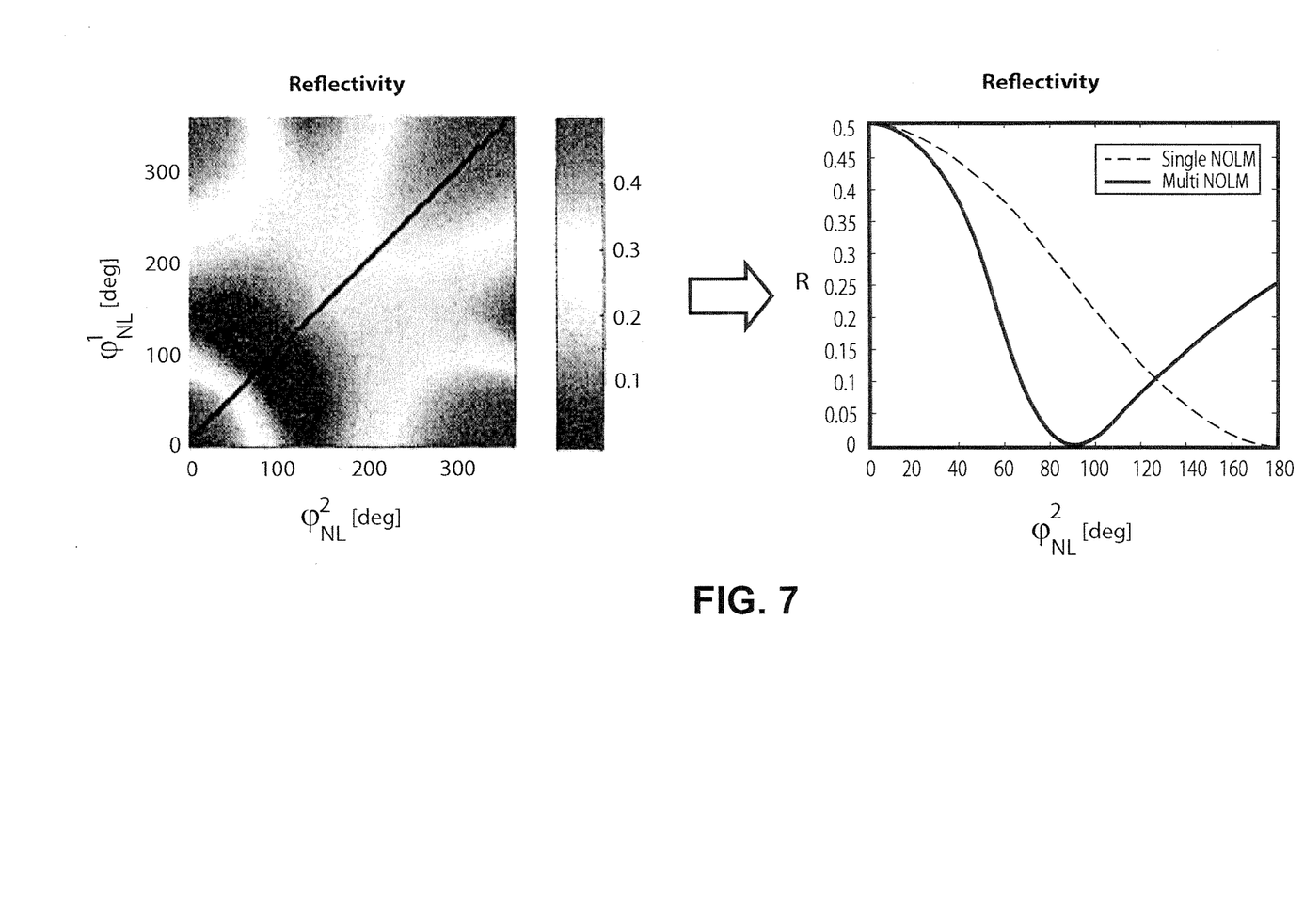

Steeper curves can be obtained by tuning the set of parameters $\theta^1$, $\theta^2$, $\theta^3$, $\Delta\phi_{NL}$. As shown in FIG. 7. FIG. 6 shows a different use of the bi-dimensional plot. Here the nonlinear phase shifts that are directly dependent on the pump powers are utilized as input signal for a NOR logical gate. This way the pump signals are directly proportional to the input signal of the logic gate. In FIGS. 6 and 7, $\theta^1 = 0°$, $\theta^2 = 0°$, $\theta^3 = 130°$, $\Delta\phi_{NL} = 190°$.

Figures 8, 9:
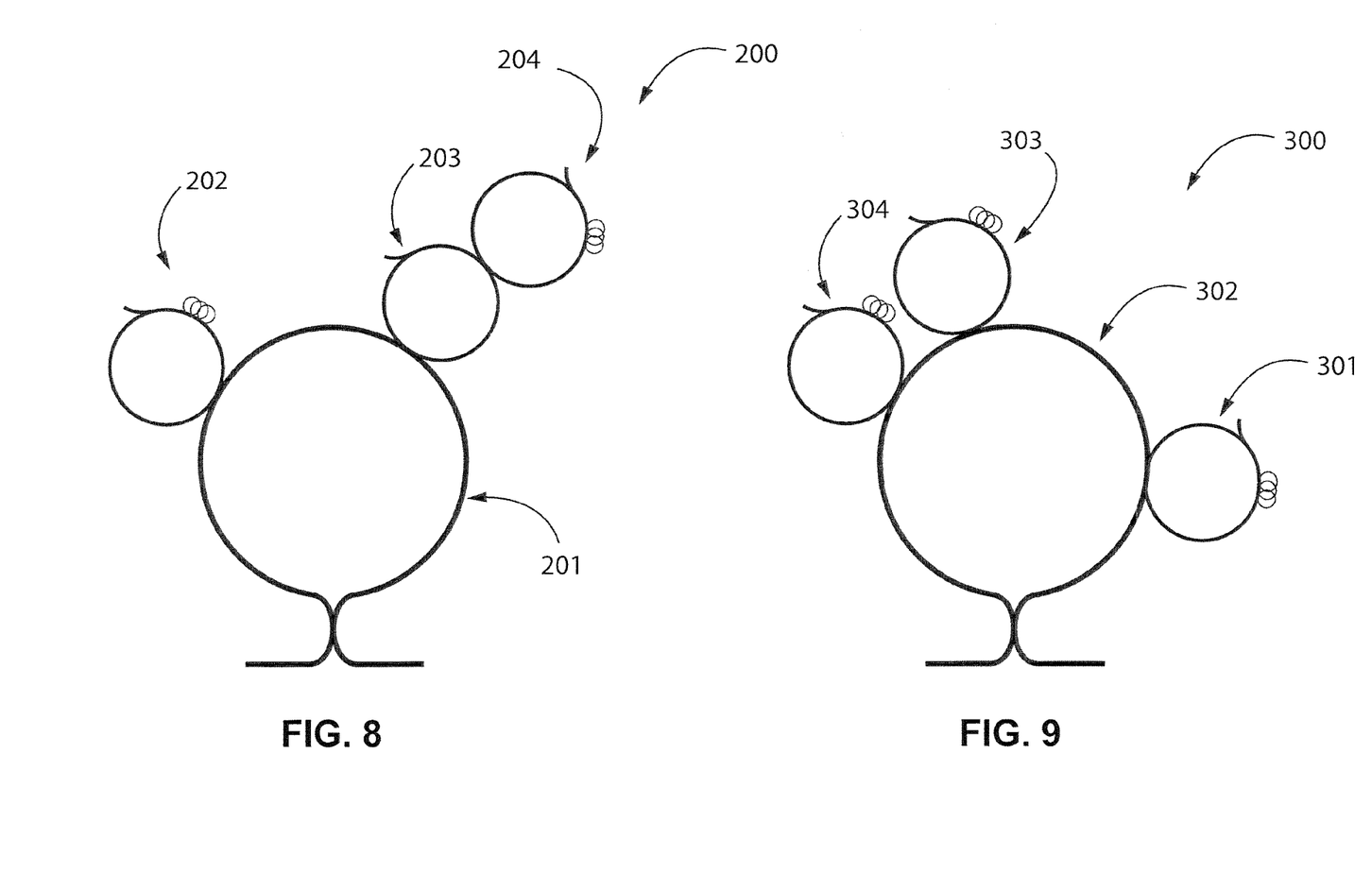
FIGS. 8 and 9 illustrate further embodiments of optical signal processors.

In addition to the processor 1 in FIG. 1, other configurations are possible, depending on the functionality required. For example FIGS. 8 and 9 show two further optical processors 200 and 300 respectively, which are embodiments of the invention. In FIG. 8, a NOLM structure 201 is connected to two spaced apart NOLM structures 202 and 203, with NOLM structure 204 directly connected to NOLM 203 only. In FIG. 9 a principle NOLM structure 301-302 is connected to single NOLM structures 303 and 304.

Advantageously, the processor 1 is readily reconfigurable, for example to perform a different logic operation by simply adjusting the difference in path length between spans 17 and 18. This can be achieved by inserting tunable optical delay lines in the path to be tuned. The processor 1 allows implementation of an arbitrary, reconfigurable non-linear optical transfer function by combining elementary XPM-based PM NOLM blocks without changing the system architecture but by simply tuning a set of optical input parameters. Moreover, the processor provides fast dynamics performance.

All curves shown in FIGS. 5 to 7 are compared with the corresponding single NOLM T or R function (dashed curves) that have sinusoidal shapes.

The invention claimed is:
1. Optical signal processor comprising
an optical waveguide loop, and
first and second phase modulator loops,
each of the first and second phase modulator loops is in optical communication with the optical waveguide loop, and
the first and second phase modulator loops respectively comprise first and second control signal input ports to control phase modulations applied by the first and second phase modulation loops, and the optical waveguide loop comprising two input ports to direct input signals in opposite directions in the optical waveguide loop and further comprising an output port to output resulting signals.

2. Optical signal processor as claimed claim 1 in which the phase modulator loops are in communication with the optical waveguide loop at different respective positions on said optical waveguide loop.

3. Optical signal processor as claimed in claim 1 in which the path length of a span of fibre of the optical waveguide loop which extends from the output port of the optical waveguide loop to the first phase modulator loop is unequal to the path length of another span of the optical waveguide loop which extends from the output port to the second phase modulator.

4. Optical signal processor as claimed in claim 3 in which at least one of the path lengths is arranged to be adjustable relative to the other path length.

5. Optical signal processor as claimed in claim 1 in which at least one of first and second phase modulator loops comprising a nonlinear optical mirror.

6. Optical signal processor as claimed in claim 1 in which at least one of the first and second phase modulation loops comprises a portion of a material whose refractive index changes nonlinearly with the intensity of a control signal.

7. Optical signal processor as claimed in claim 1 which is an optical logic gate device.

8. A method of processing optical signals comprising
causing two input signals to counter-propagate in an optical waveguide loop, and pass through first and second phase modulator loops, the first and second phase modulator loops being in optical communication with the optical waveguide loop,
the method further comprising feeding a control signal into a control port of each of the first and second phase modulator loops so as to control phase modulation applied to the input signals by each of the first and second phase modulator loops, and
combining the resulting signal components to produce an output signal.

9. A method as claimed in claim 8 which is a method of performing a logic operation on at least two binary signals.

10. A method as claimed in claim 9 in which both of the at least two binary signals are fed into the control port of each of the first and second phase modulator loops.

11. An optical signal processor, comprising: a coupler; an optical waveguide loop comprising first, second, and third spans; and first and second phase modulator loops respectively comprising first and second control ports, wherein an optical path is formed such that first and second ends of the first span are respectively in optical communication with the coupler and a first end of the first phase modulator loop, first and second ends of the third span are respectively in optical communication with a second end of the first phase modulator loop and a first end of the second phase modulator loop, and first and second ends of the second span are respectively in optical communication with a second end of the second phase modulator loop and the coupler, wherein the coupler is structured to generate first and second signal components based on an input signal, wherein the optical waveguide loop is structured to receive the first signal component at the first end of the first span and to propagate the first signal component in the optical path in a first direction towards the second end of the second span, and receive the second signal component at the second end of the second span and to propagate the second signal component in the optical path in a second direction towards the first end of the first span, and wherein the first phase modulator loop is structured to tunably delay the first signal component based on a first control signal applied to the first control port, wherein the second phase modulator is structured to tunably delay the second signal component based on a second control signal applied to the second control port, and wherein the coupler is structured to
receive the delayed first signal component exiting the second end of the second span, receive the delayed second signal component exiting the first end of the first span, and generate an output signal based on the based on the delayed first and second signal components.

12. The optical signal processor of claim 11, wherein a length of the first span is not equal to a length of the second span.

13. The optical signal processor of claim 11, wherein the first phase modulator loop is structured to nonlinearly modulate a phase of the first signal component based on an intensity of the first control signal.

14. The optical signal processor of claim 13, wherein the second phase modulator loop is structured to nonlinearly modulate a phase of the second signal component based on an intensity of the second control signal.

15. The optical signal processor of claim 11, wherein the second phase modulator loop is structured to nonlinearly modulate a phase of the second signal component based on an intensity of the second control signal.

16. The optical signal processor of claim 11, further comprising a third phase modulator loop in the optical path between the first end of the first span and the second end of the second span, the third phase modulator loop comprising a third control port,
wherein the third phase modulator loop is structured to tunably delay the first and/or second modulated signal components propagating in the optical path based on a third control signal applied to the third control port.

17. The optical signal processor of claim 16, wherein the third phase modulator loop is in the optical path between the left and second ends of the third span.

18. The optical signal processor of claim 16, wherein the third phase modulator loop is in the optical path between the left and second ends of the second phase modulator loop.

* * * * *

UNITED STATES PATENT AND TRADEMARK OFFICE
CERTIFICATE OF CORRECTION

PATENT NO. : 8,467,121 B2
APPLICATION NO. : 12/919554
DATED : June 18, 2013
INVENTOR(S) : Bogoni et al.

It is certified that error appears in the above-identified patent and that said Letters Patent is hereby corrected as shown below:

On the Title Page, in Item (56), under "OTHER PUBLICATIONS", in Column 2, Lines 6-8 delete "Jinno, Masahiko; Nonlinear Sagnac Interferometer Switch and its Applications; IEEE Journal of Quantum Electronics, vol. 28, No. 4, Apr. 1992, pp. 875-882.".

In the Specification

In Column 1, Line 55, delete "DESCRIPTION" and insert -- BRIEF DESCRIPTION --, therefor.

In Column 2, Line 21, delete "i=1, 2, 3." and insert -- i=1, 2, 3, --, therefor.

In Column 3, Line 25, delete "$(P_p^{(1)}, P_p^{(2)}))$" and insert -- $(P_p^{(1)}, P_p^{(2)})$ --, therefor.

In Column 3, Line 56, delete "end." and insert -- end --, therefor.

In Column 4, Line 6, delete "signals" and insert -- signals. --, therefor.

In Column 4, Line 9, delete "15." and insert -- 15, --, therefor.

In the Claims

In Column 5, Line 7, in Claim 2, delete "claimed claim" and insert -- claimed in claim --, therefor.

In Column 5, Line 15, in Claim 3, delete "span of the optical" and insert -- span of fibre of the optical --, therefor.

In Column 6, Line 23, in Claim 11, delete "based on the based on the" and insert -- based on the --, therefor.

Signed and Sealed this
First Day of April, 2014

Michelle K. Lee
*Deputy Director of the United States Patent and Trademark Office*